US006823330B1

(12) United States Patent
Calvillo et al.

(10) Patent No.: US 6,823,330 B1
(45) Date of Patent: Nov. 23, 2004

(54) SITE HOME NAVIGATION CONTROL

(75) Inventors: Michael J. Calvillo, Sioux City, IA (US); Joseph G. Richard, Sioux City, IA (US); Glen J. Anderson, Sioux City, IA (US); Russell F. McKnight, Sioux City, IA (US)

(73) Assignee: Gateway, Inc., Irvine, CA (US)

( * ) Notice: Subject to any disclaimer, the term of this patent is extended or adjusted under 35 U.S.C. 154(b) by 0 days.

(21) Appl. No.: 09/442,048

(22) Filed: Nov. 16, 1999

(51) Int. Cl.⁷ .............................................. G06F 17/30
(52) U.S. Cl. .............................. 707/3; 707/10; 345/763
(58) Field of Search ......................... 707/1–3, 10, 514; 345/762–763, 700; 709/224; 705/14

(56) References Cited

U.S. PATENT DOCUMENTS

| | | | |
|---|---|---|---|
| 5,615,363 A | 3/1997 | Jenness | 395/614 |
| 5,644,739 A | 7/1997 | Moursund | 395/354 |
| 5,649,186 A * | 7/1997 | Ferguson | 707/10 |
| 5,717,860 A * | 2/1998 | Graber et al. | 705/14 |
| 5,793,964 A | 8/1998 | Rogers et al. | 395/200.32 |
| 5,799,292 A | 8/1998 | Hekmatpour | 706/11 |
| 5,812,769 A | 9/1998 | Graber et al. | 395/200.12 |
| 5,845,299 A | 12/1998 | Arora et al. | 707/513 |
| 5,848,427 A | 12/1998 | Hyodo | 707/513 |
| 5,854,624 A | 12/1998 | Grant | 345/169 |
| 5,854,901 A | 12/1998 | Cole et al. | 395/200.75 |
| 5,862,395 A | 1/1999 | Bier | 395/800.01 |
| 5,870,559 A * | 2/1999 | Leshem et al. | 707/10 |
| 5,893,127 A | 4/1999 | Tyan et al. | 707/513 |
| 5,911,145 A * | 6/1999 | Arora et al. | 715/514 |
| 5,935,210 A * | 8/1999 | Stark | 709/224 |
| 5,949,419 A * | 9/1999 | Domine et al. | 345/744 |
| 6,105,021 A * | 8/2000 | Berstis | 707/10 |
| 6,175,863 B1 * | 1/2001 | Belfiore et al. | 345/760 |
| 6,226,655 B1 * | 5/2001 | Borman et al. | 707/501.1 |
| 6,269,362 B1 * | 7/2001 | Broder et al. | 707/1 |
| 6,314,424 B1 * | 11/2001 | Kaczmarski et al. | 707/10 |
| 6,336,116 B1 * | 1/2002 | Brown et al. | 707/10 |

OTHER PUBLICATIONS

Denise Tyler, Microsoft Frontpage 98, Copyright 1997, pp. 70–71.*

* cited by examiner

*Primary Examiner*—Greta Robinson
*Assistant Examiner*—Angela S. White
(74) *Attorney, Agent, or Firm*—Kevin E. West; Suiter-West

(57) ABSTRACT

A method is provided for locating and navigating to the site home of a network site in an information network such as the Internet, an Intranet, or the like from a site page within the network site. In an exemplary embodiment, the method includes the steps of receiving a request to navigate from a site page to the site home of the network site, determining a site home for the network site, and when a site home is found for the network site, navigating to the site home in response to the received request so information provided by the site home may be communicated to a user. The method may be implemented as a program of instructions storable on a medium readable by an information handling system for causing the information handling system to perform the steps of the method.

46 Claims, 12 Drawing Sheets

SITE HOME NAVIGATION CONTROL

FIELD OF THE INVENTION

The present invention relates generally to information networks such as the Internet, an Intranet, or the like and more specifically to a site home navigation control for providing standardized within-site navigation to the site home page of a network site from site pages within the network site.

BACKGROUND OF THE INVENTION

Internet search engines provide users with exhaustive lists of links to content pages based on search string criteria entered by the user. The user may then select among the links, which contain uniform resource locators (URLs) for the content pages, to navigate to a particular site page in order to view the content provided by that page. Often, a selected link will jump the user to a subordinate site page of a given site instead of the site home page of that site. Consequently, the content provided by the subordinate site page may be presented out of context with other information furnished by the site. In such cases, it may be desirable to navigate directly from the subordinate page to the site home in order to gain additional contextual information about the overall site.

Presently, the ability of users to navigate to the site home of a network site from a site page within the network site is dictated exclusively by the author of the network site. However, the authors of many sites do not include any type of "home" navigation mechanism for allowing navigation directly to the site home from pages within the site. Similarly, the authors of other sites may only include "home" navigation aids that allow navigation from certain pages within the site. Further, when authors do provide some type of "Home" navigation aid, the implementation of such navigation aids varies greatly from site to site since there is currently no standard for their implementation. For instance, since implementation of the navigation aid is dependent on the author of the site, selection of the site home navigation aid may provide unexpected results, jumping the user to site pages other than the desired site home, and possibly causing the user to become lost within the network site. Further, authors may employ different physical mechanisms to provide navigation to the site home. An author may, for example, utilize hypertext links embedded within the site pages, or may employ graphics such as icons or buttons. Similarly, authors often vary the physical location where the site home navigation mechanism is displayed.

The lack of consistency as to whether a site home navigation aid is provided, where the aid is provided, the results provided by its selection and its implementation in the page is confusing to users. Consequently, it would be advantageous to provide a site home navigation control for providing within-site navigation to the site home of sites in an information network such as the Internet, an Intranet, or the like from site pages within the network site which would not be dependent on authors of the network site for its implementation. Preferably, the site home navigation control would be implemented within the user's network browser to provide a consistent, standardized user interface.

SUMMARY OF THE INVENTION

Accordingly, the present invention is directed to a method for implementing a site home navigation control capable of locating and navigating to the site home of a network site in an information network such as the Internet, an Intranet, or the like from site pages within the network site. Preferably, the site home navigation control is implemented within the user's network browser to provide a consistent, standardized user interface to users.

In an exemplary embodiment, the method includes the steps of receiving a request to navigate from a site page to the site home of the network site, determining a site home for the network site, and when a site home is found for the network site, navigating to the site home in response to the received request so information provided by the site home may be communicated to a user. Alternately, when a site home is not found for the network site, the method may further comprise the step of communicating to the user that the site home was not found. The method may be implemented as a program of instructions storable on a medium readable by an information handling system for causing the information handling system to perform the steps of the method.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to presently preferred embodiments of the invention, examples of which are illustrated in the accompanying drawings.

Figure 1:
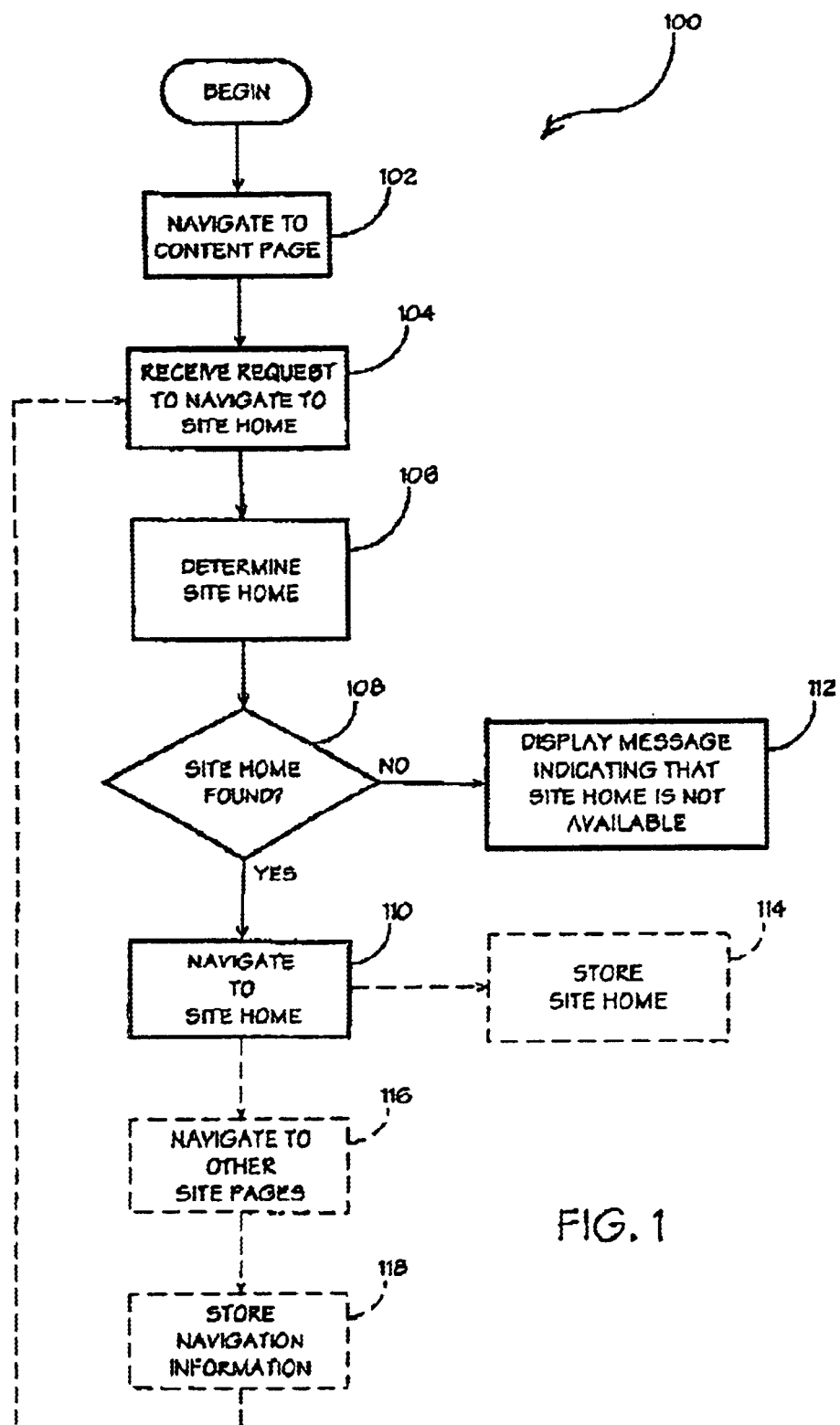
FIG. 1 is a flow diagram illustrating a method for providing site home navigation in accordance with an exemplary embodiment of the present invention.
Figure 2:
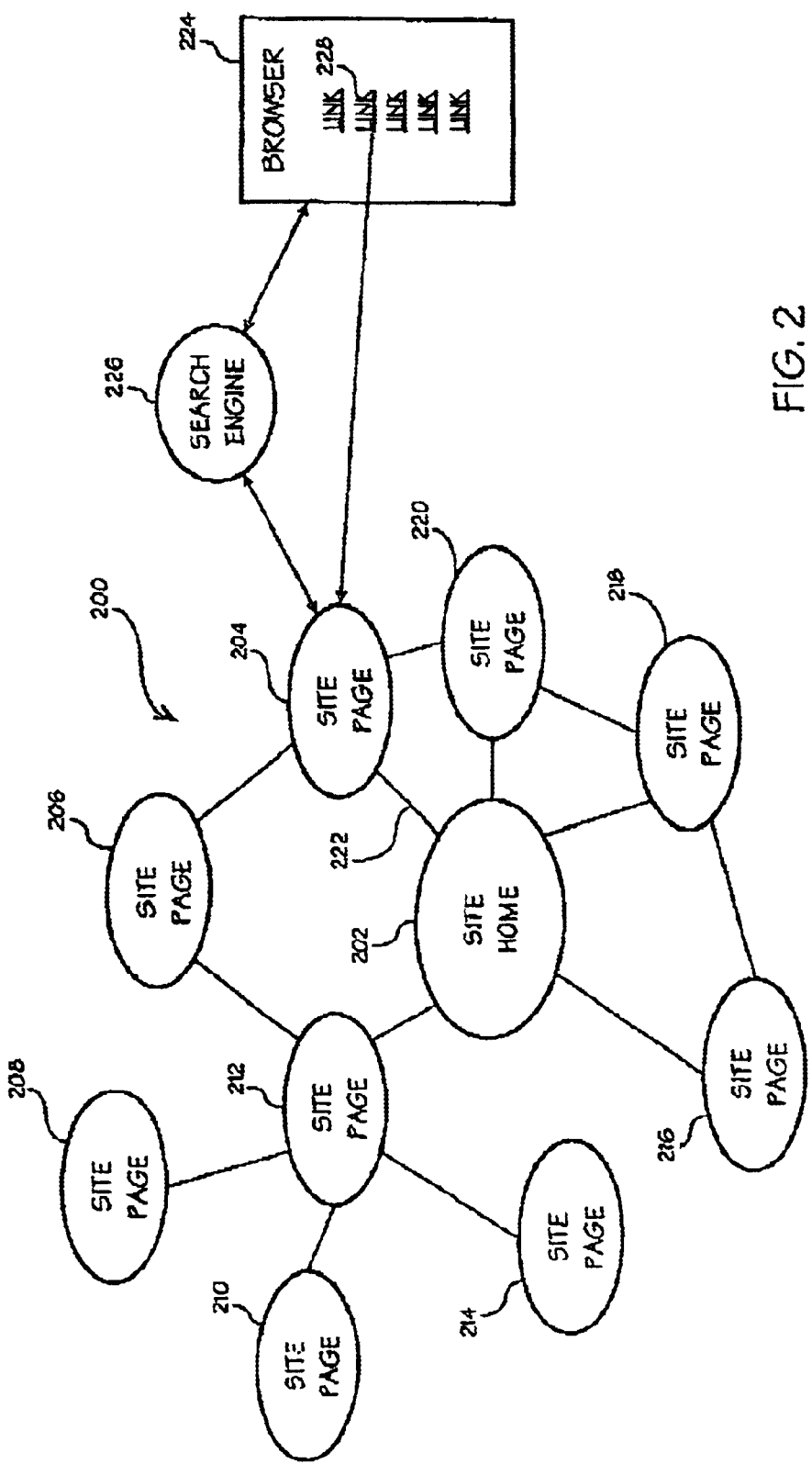
FIG. 2 is a block diagram illustrating a network site in an information network.

Referring now to FIG. 1, an exemplary method for implementing a site home navigation control capable of locating and navigating to the site home of a network site in an information network from a site page within the site is discussed. The method 100 initiates at step 102 wherein a user navigates to a site page within a network site. As shown in FIG. 2, a network site 200 is comprised of a one or more site pages 202–220 associated together within an information network such as the Internet, an Intranet, or the like. Typically, one site page within the network site 200 provides a site home 202 which serves as the site's starting point and may function as a table of contents providing contextual information for content provided by the various subordinate site pages 204–220 associated therewith. Links 222 interconnect the site pages 202–220 and allow users to navigate between the site home 202 and subordinate site pages 204–220, and between one subordinate site page 204–220 and another.

In an exemplary embodiment, the network site 200 may be a Web site including site pages 202–220 comprised of related hypertext markup language (HTML) documents and associated files, scripts and data bases served up by one or more hypertext transfer protocol (HTTP) servers on the World Wide Web (WWW). The HTML documents in such a Web site generally cover one or more related topics and are interconnected through one or more hyperlinks. Hyperlinks provide a connection between an element in an HTML document, such as a word, phrase, symbol, or image, and a different element in the document, another HTML document, a file or a script. A user may activate a hyperlink by clicking on the linked element, which is usually underlined or in a color different from the rest of the document to indicate that the element is linked. Hyperlinks are identified within an HTML document through HTML tags which are generally not visible to the user.

As shown in FIG. 2, a network browser 224 is used to access site pages 202–220 within the information network. To navigate to a specific site page 204, a user may access a network based search engine 226 to search for site pages on the network matching desired search criteria Typically, such search engines 226 search for keywords within available site pages to produce a list of links 228 to site pages having content corresponding to the desired search criteria which are displayed by the network browser 224. The user may then select a link from the list 228 which navigates the user to the site page 204 associated with the link 228. Alternately, the user may arrive at the site page 204 through another route. For instance, the user may navigate to the site page 204 by selecting a link from a site page in another network site, or the user may simply enter the address of the desired site page 204 into the network browser 224 which causes the user to be navigated to the desired site page 204. After viewing the site page 204, a user may wish to acquire contextual information about the network site 200. For example, other site pages 206–220 of the network site 200 may provide supplementary information the user wishes to view, or the site home 202 or another site page 206–220 of the network site 200 may provide information essential for understanding the content provided by the original site page 204. As a result, the user may wish to navigate to the site home 202 of the network site 200.

Figure 3A:
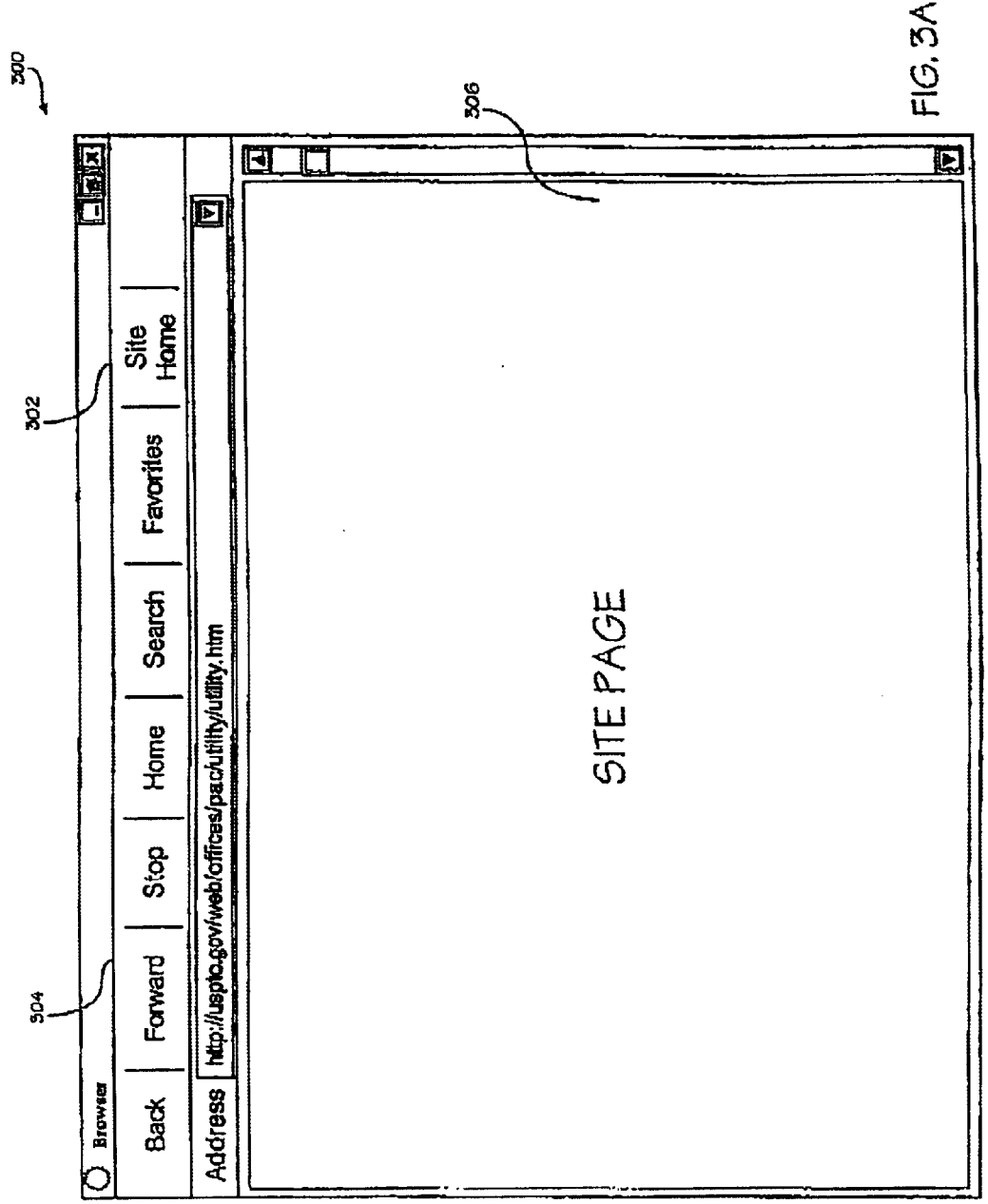
FIGS. 3A, 3B and 3C are schematic views depicting exemplary browser displays wherein the browser employs a site home navigation control in accordance with an exemplary embodiment of the present invention.
Figure 3B:
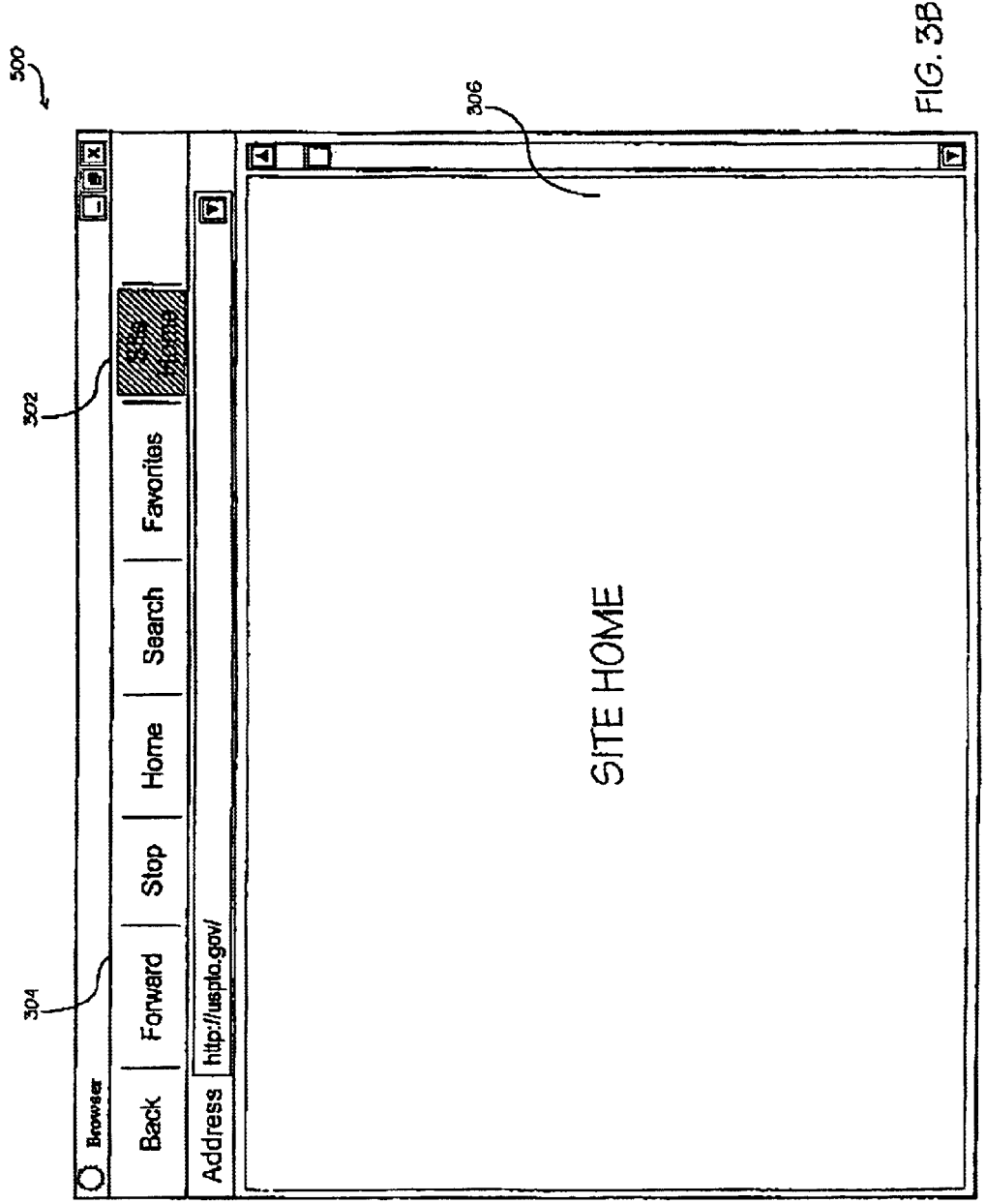
Figure 3C:
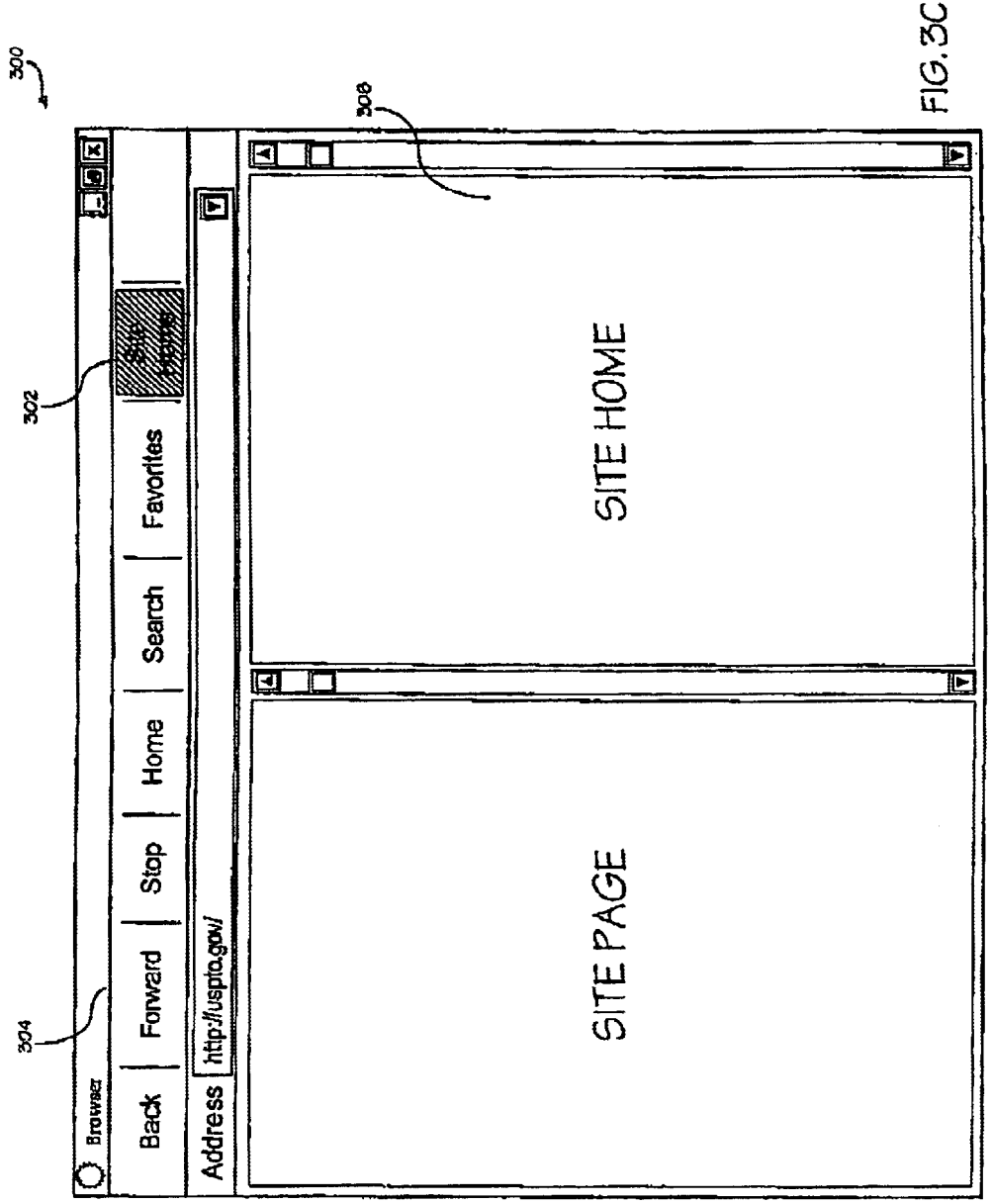

Referring now to FIGS. 3A, 3B and 3C, in accordance with an exemplary embodiment of the present invention, the user, wishing to navigate to the site home of a network site, may enter a request to navigate to the site home utilizing a site home navigation control displayed as part of his or her network browser. In one embodiment, an exemplary network browser utilizes a display device (see FIG. 10) employing a graphical user interface (GUI) environment to represent documents, files, and command options to the user. In such an environment, the site home navigation control may be implemented as an icon within the network browser display 300. For instance, as shown in FIGS. 3A and 3B, the site home navigation control is comprised of a button 302 displayed within the browser's navigation bar 304. A user selects and activates the site home navigation button 302 by "depressing" or "clicking" the button 302 using a cursor control device such as a mouse, trackball, trackpad, or the like (see FIG. 10). As shown in FIG. 3A, the site home navigation button 302 may remain in the "up" or non-depressed state while the user is viewing site pages other than a site home of a network site. When a user is viewing a site home of a network site, as shown in FIG. 3B, the site home navigation button 302 is held in a "down" or depressed state until the user navigates to a site page other than a site home. In this manner, the user can determine whether the page he or she is currently viewing is a site home for the network site by checking the state (non-depressed or depressed) of the site home navigation button 302.

It should be appreciated that, although display of the site home navigation control is described herein in an exemplary embodiment as being implemented as a button 302 displayed within a graphical network browser display 300, the physical implementation of the site home navigation control may be altered without departing from the scope and spirit of the present invention. For instance, the site home navigation control may be displayed as a hyperlink overlaid onto the site page by the network browser. Similarly, the site home navigation control may be implemented utilizing a non-graphical user interface (GUI) communication means. For example, the site navigation control may be implemented utilizing voice recognition technologies, a dedicated key within a keyboard or keypad, a tactile input device such as a touch screen, or the like.

Turning again to FIG. 1, upon receiving the request to navigate to the site home at step 104, the site home for the network site is determined at step 106. For instance, a search for the site home may be initiated in response to the user "clicking" the site home button 302 of the network browser display 300 shown in FIG. 3A. Alternatively, a search for the site home may be automatically initiated as a background process each time the user is navigated to a new site page and prior to receipt of a request to navigate to the site home by the user at step 104.

When a site home can be determined for the network site, at step 108, the user is navigated to the site home at step 10. The site home navigation control inherits the link properties of the site home. In this manner, as shown in FIG. 3B, the contents of the site home may be displayed within the viewing area 310 of the browser display 300 thereby replacing the contents of the site page. Alternately, as shown in FIG. 3C, the contents of the site home may be displayed simultaneously with the contents of the site page as a separate frame within the viewing area 310 of the network browser display 300.

It will be appreciated that in some instances it may be impossible to determine the site home for the network site at step 108. For example, the site home may be impossible to identify from information available to the user, or the network site may simply contain no identifiable site home. In such instances, a message may be communicated to the user indicating that the site home is not available at step 112. Such a message may, in one embodiment, be provided via a message box displayed over the network browser display 300 shown in FIG. 3A.

Further, the address of the site home for the network site may optionally be stored for future use at step 114. For example, the address (e.g., the URL) of the site home may be stored to a "history" or "favorites" list comprised of the addresses of site home pages visited by the user. The user may then select the site home from the list should he or she again desire to visit the site home. Additionally, as the user navigates to other site pages from the site home, as in step 116, the link properties of site pages visited may be optionally stored at step 118 allowing the user to return to the site home from site pages within the network site without again searching for the site home at step 106.

Turning now to FIGS. 4 through 8, exemplary methods implementing strategies for determining a site home of a network site (step 106 of FIG. 1) wherein the network site comprises a Web site on the World Wide Web (WWW are discussed. It should be appreciated that the strategies implemented by the methods discussed herein are exemplary in nature and are not meant to be exhaustive of all possible strategies for determining a site home within a network site. Consequently, one of skill in the art may develop equivalent strategies other than those specifically disclosed herein without departing from the scope and spirit of the present invention.

Figure 4:
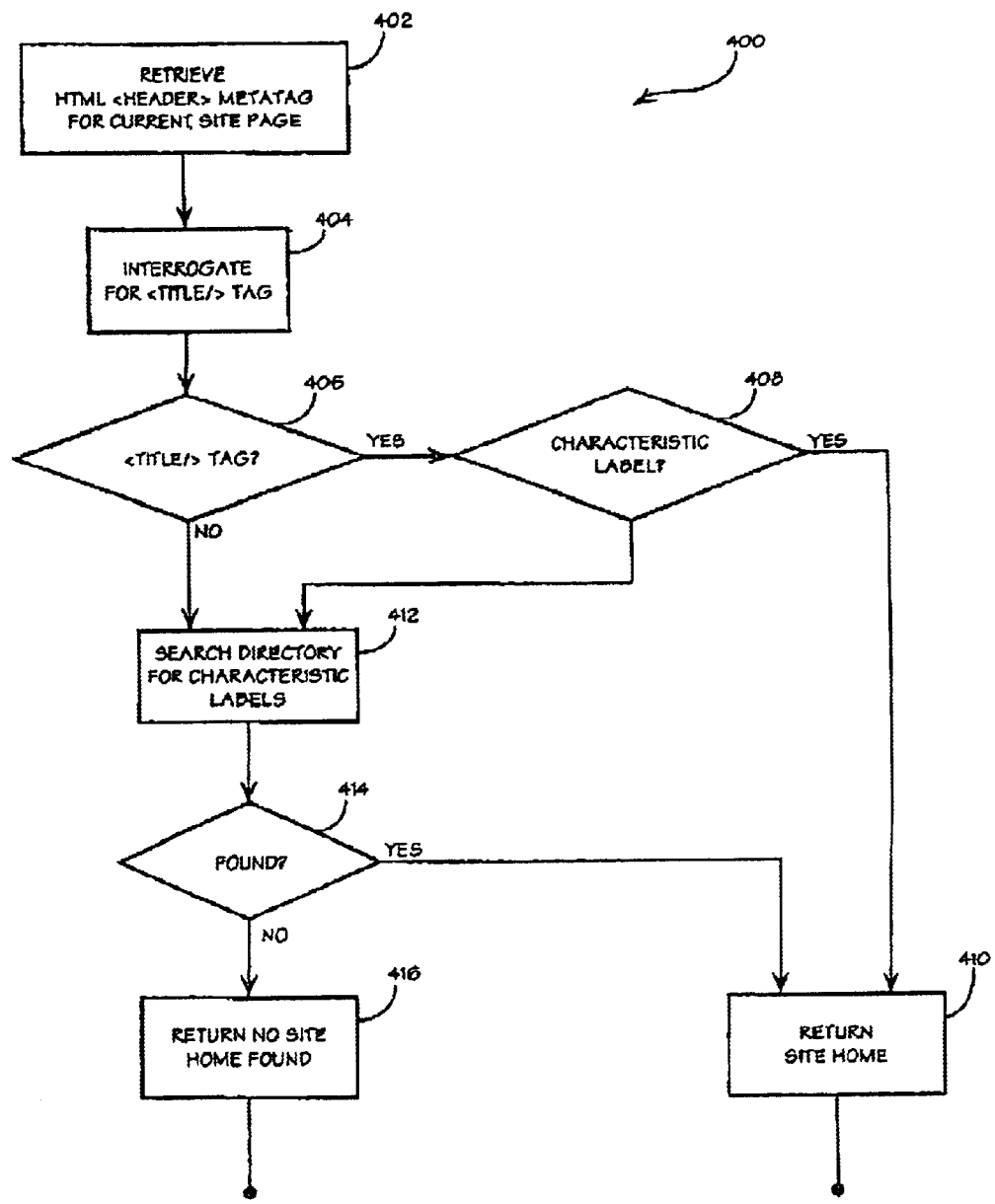
FIG. 4 is a flow diagram illustrating an exemplary method wherein the site home is determined by identifying a characteristic name assigned to the site home.

Referring now to FIG. 4, an exemplary method is described wherein the site home is determined by identifying a characteristic name assigned to the site home. The method 400 is initiated at step 402 wherein the HTML <Header> metatag of the Web page being viewed by the user is retrieved at step 402 and interrogated for the presence of a <Title/> tag at step 404. When a <Title/> tag is located at step 406, a determination is made whether the characteristic name of a site home of the Web site is present at step 408. Such characteristic names may include, but are not limited to, index.htm, index.html, default.htm, default.html, home.htm, and home.html. When a determination is made that the characteristic name is present in the <Title/> tag at step 408, the site page is identified as the site home and the address of the site page is returned to the method 100 (FIG. 1) at step 410 as the address of the site home. The network browser continues to display the current site page. However, as shown in FIGS. 3B and 3C, the site home button 302 of the network browser display 300 may be held in the "depressed" state until the user navigates to a non-site home page.

Alternately, when it is determined at step 406 that the <Title/> tag is not present, at step 406, or it is determined that the <Title/> tag does not include the characteristic name of the site home at step 408, the operating system directory of the server serving up the network site is searched for the presence of a characteristic name corresponding to a site home at step 412. When a characteristic name of a site home is found in the directory at step 414, the address (URL) of the site page to which it corresponds is returned to method 100 (FIG. 1) at step 410 as the site home of the network site. Alternately, when it is determined that the characteristic name is not found in the operating system directory, at step 414, a message indicating that no site home was found is returned to method 100 (FIG. 1) at step 416.

Figure 5:
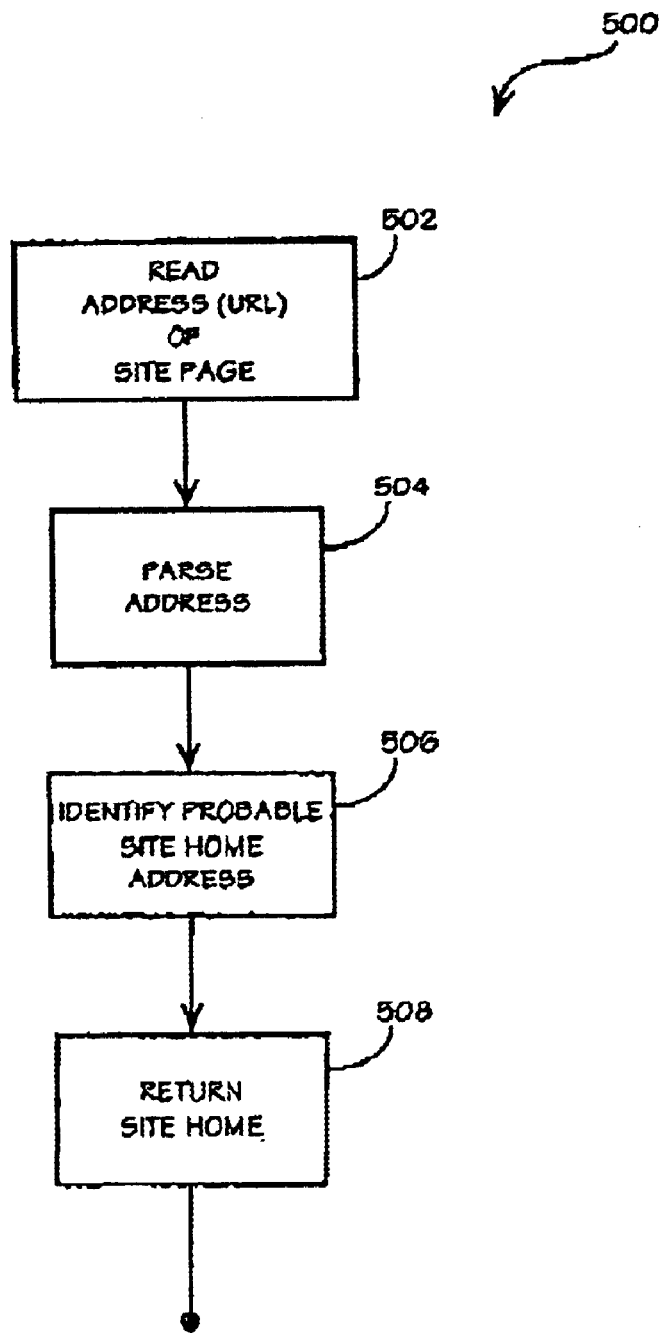
FIG. 5 is a flow diagram illustrating an exemplary method wherein the site home is determined by parsing components of the address of the site page to acquire a probable address of the site home.

Referring now to FIG. 5, an exemplary method is described wherein the site home is determined by parsing components of the address of the site page to acquire a probable address of the site home. The method 500 is initiated at step 502 by reading the address of the site page. In an exemplary embodiment, wherein the network site is comprised of a Web site within the World Wide Web, the address of the site page is comprised of a uniform resource locator (URL) utilizing a protocol such as hypertext transfer protocol (http) or file transfer protocol (ftp). The URL, in addition to specifying the protocol to be used in accessing the resource such as http for a world wide web page or ftp for a file transfer protocol site, also specifies the name of the server on which the resource resides, and optionally, the path to the resource (such as an HTML document or file on the server). Address components or parts of the URL are separated by one of a forward slash ("/") and a forward double slash ("//"). The forward slash ("/") is used to separate address components from one another while the forward double slash ("//") is used with a colon (":") to separate the URL protocol from the URL host server. Thus, an exemplary site page may have the following URL:

http://www.uspto.gov/web/offices/pac/utility/utility.htm wherein "http" specifies the URL protocol and "www.uspto.gov" specifies the URL host server. A colon and forward double slash ("://") separates the URL protocol from the URL host machine name. In accordance with the method 500 described herein, the address is parsed into its component parts at step 504. Thus, is the foregoing example, the URL may be parsed as follows wherein spaces separate parsed address components or parts:

http:// www.uspto.gov /web /offices /pac /utility /utility.htm

A probable address for the site home is next identified from the parsed address components at step 506. For a URL, the probable address (URL) for the site home may be identified as the URL stem representing the host server name comprised of the address component located between forward double slashes ("//") and the next following single forward slash ("P"). Thus, in the forgoing example a possible home site address may be determined to be:

http://www.uspto.gov

The method returns the probable address (e.g., the URL "http://www.uspto.gov") as the URL of the site home at step 508.

Figure 6:
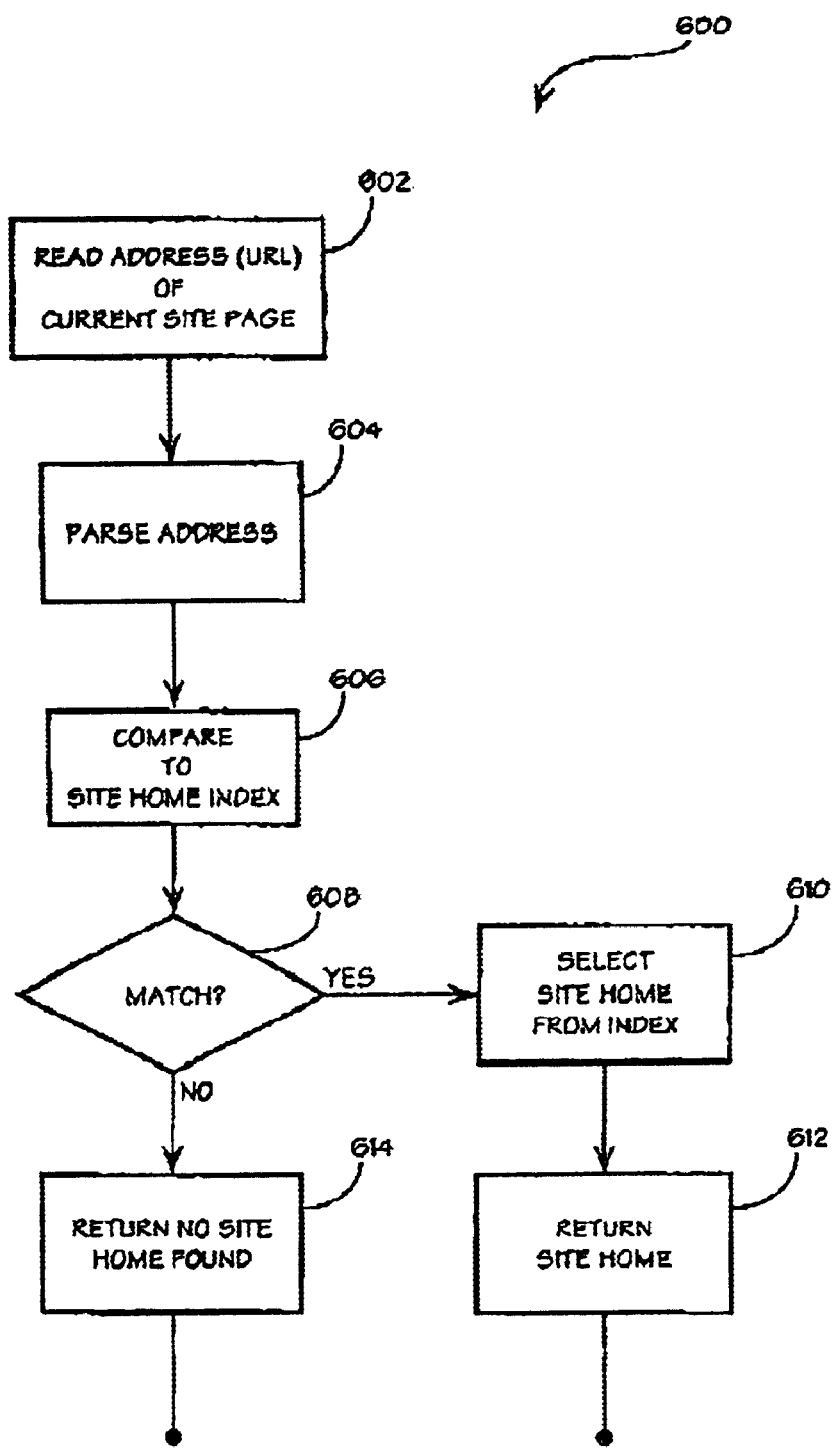
FIG. 6 is a flow diagram illustrating an exemplary method wherein the site home is determined by comparing the address components of a parsed site page address to a stored index of known site homes.

Referring now to FIG. 6, an exemplary method similar to the parsed address method 500 of FIG. 5 is discussed wherein the address components of the parsed site page address are compared to a stored index of known site homes. The method 600 is initiated at step 602 by reading the address (URL) of the site page. The address is then parsed in to its component parts at step 604 (see discussion of FIG. 5). Each of the parsed address components is compared, at step 606, to addresses of site homes stored in an index or database to determine whether a component of the parsed address matches a known site home address. Such an index may, for example, contain addresses of site homes registered with a central source such as an Internet provider, a search engine provider or a browser manufacturer, or alternately, may be site homes recently visited by the user and stored by the user's network browser. When it is determined that a component of the parsed address matches a known site home address, at step 608, the site home address is selected from the index at step 610, or alternately selected from the parsed address itself, and returned to method 100 (FIG. 1) at step 612 as the address of the site home. Alternately, when none of the parsed address components can be identified as the address of the site home because they are not contained within the index, for example, when the site home and site page are provided by different servers, a message indicating that no site home could be found is returned at step 614.

In an exemplary embodiment, wherein the network site is a Web site within the World Wide Web (WWW and the address of Web page is comprised of uniform resource locator (URL) as discussed in the description of FIG. 5 such as the URL http://www.uspto.gov/web/offices/pac/utility/utility.htm described, supra, each address component is compared against an index of URLs of known site homes. For example, a partial index of URL's might include www.usfda.gov
www.abcd.com
www.zyxw.org
www.school.edu
www.uspto.gov
www.college.edu
. . .

The parsed address component "www.uspto.gov" is found in the index and returned as the probable address of the site home.

Figure 7:
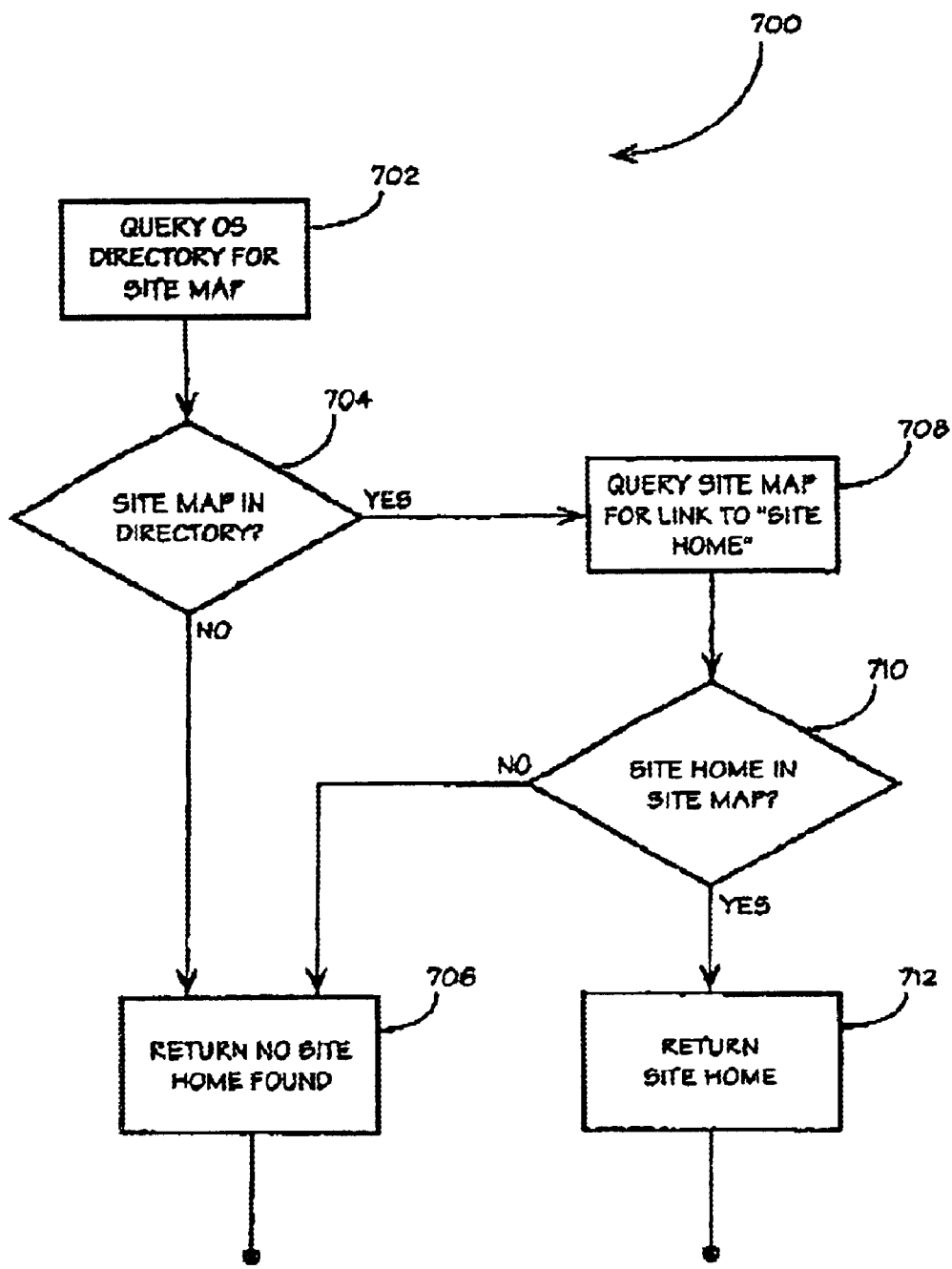
FIG. 7 is a flow diagram illustrating an exemplary method wherein the site home is determined by querying a site map for the network site.

Turning now to FIG. 7, an exemplary method is discussed wherein the site home is determined by querying a site map for the network site. The method 700 is initiated at step 702 wherein the Operating System (OS) directory of the network server serving up the network site is queried for the existence of a site map. A determination is made whether a site map is found in the directory at step 704. When no site map is found at step 704, a message indicating that no site home was found is returned at step 706. Alternately, when it is determined that a site map is present in the directory, at step 704, the site map is queried for a link to the site home at step 708. A second determination is then made whether a link to a site home of the network site is present in the site map at step 710. When no link is found, a message indicating that no site home was found is returned at step 706. Alternately, when a link to a site home is found at step 710, the link is selected from the site map and the address of the site home is returned to method 100 (FIG. 1) at step 712.

Figure 8:
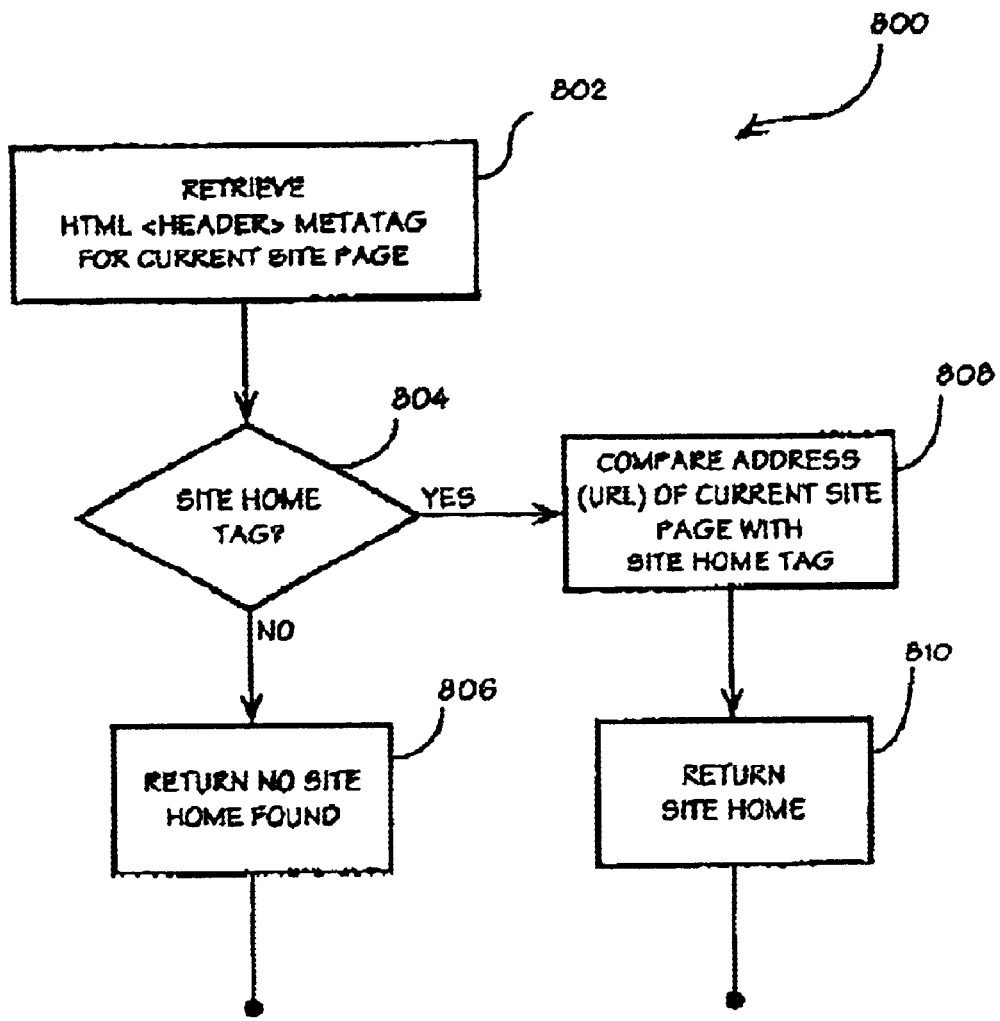
FIG. 8 is a flow diagram illustrating an exemplary method for determining the site home wherein a new HTML standard or convention is developed.

Referring now to FIG. 8, an exemplary method is discussed wherein a convention or standard is developed to provide site home navigation in accordance with the present invention. In one embodiment, wherein the network site is a Web site on the Word Wide Web (WWW), a change to the HTML language is implemented for allowing the direct identification of site home pages via a dedicated "site home" tag incorporated in the HTML metatag associated with documents and files of site pages within the network site. For example, a site home tag for a the site home having the URL "www.uspto.gov" may have a format similar to the following:

<Site Home>uspto.gov</Site Home>

Employing such a convention or standard, a method 800 for determining the site home of the network site may be implemented by first determining if a site home tag is utilized with the current site page by the site's author in accordance with the convention or standard at step 802. When it is determined at step 804 that no site home tag is found in the site page HTML metatag, a message indicating that no site home was found is returned to method 100 (FIG. 1) at step 806. However, when it is determined that the convention or standard was used at step 804, the address of the site home is retrieved from the site home tag and compared with the address of the current site page at step 806. When the address of the site home matches the address of the current site page, the site page is identified as the site home and the address of the site page is returned to method 100 (FIG. 1) at step 810 as the address of the site home. The network browser continues to display the current site page. However, as shown in FIG. 3B, the site home button 302 of the network browser display may be "depressed" until the user navigates to a non-site home page. Alternately, when the address of the site home does not match the address of the current site page at step 810, the new address of the site home is returned to method 100 (FIG. 1) at step 814.

Figure 9:
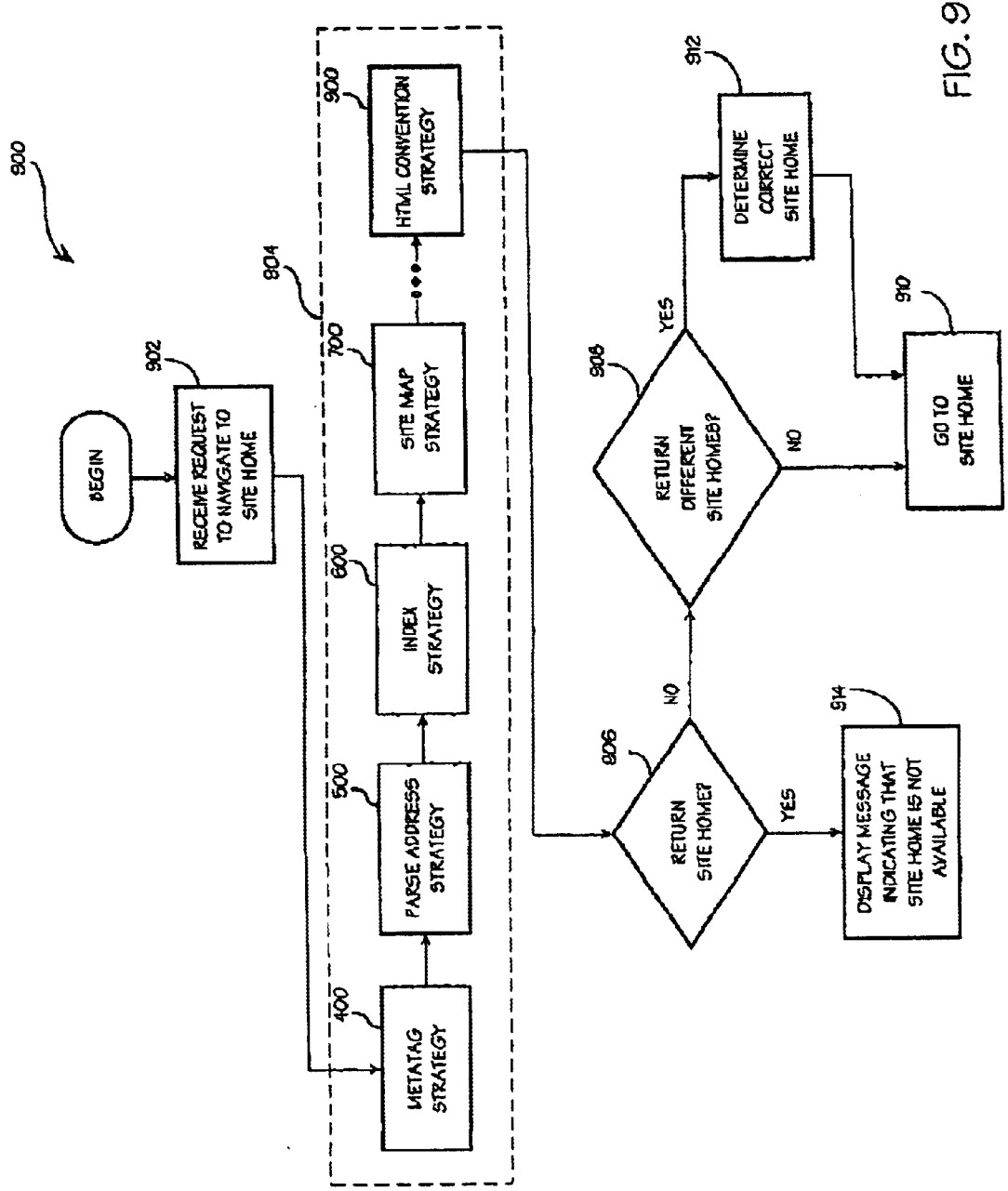
FIG. 9 is a flow diagram illustrating a method for providing site home navigation in accordance with an exemplary embodiment of the present invention wherein a plurality of methods for determining the site home are utilized in conjunction.

Referring now to FIG. 9, an exemplary method for implementing a site home navigation control capable of utilizing multiple strategies for the determining the site home of the network site is discussed. The method 900 initiates at step 902 wherein a user having navigated to a site page within a network site requests navigation to the site home of the network site as discussed in the description of FIGS. 1, 2 and 3. Upon receiving the request to navigate to the site home at step 902, the site home for the network site is determined at step 904. For instance, as discussed in connection with FIG. 1, a search for the site home may be initiated in response to the user "clicking" the site home button 302 of the network browser display 300 shown in FIG. 3A. Alternatively, a search for the site home may be automatically initiated as a background process each time the user is navigated to a new site page and prior to receipt of a request to navigate to the site home by the user at step 902.

As shown in FIG. 9, one or several strategies, such as the exemplary strategies 400, 500, 600, 700 & 800 of FIGS. 4 through 8, may be used in conjunction to locate the most probable site home for the network site. For example, in one embodiment shown in FIG. 9, each of the various strategies implemented by methods 400, 500, 600, 700 & 800 may be attempted and the results returned by each compared to determine the most likely site home address. When at least one site home is determined for the network site at step 906, a second determination is made, at step 908, whether multiple site home addresses were returned by the various methods 400, 500, 600, 700 & 800 of step 904. When only one site home address is returned, the user is navigated to the site home corresponding to that address at step 910. When multiple site home addresses are returned by the methods 400, 500, 600, 700 & 800 of step 904, a determination is made as to which of the probable site homes is most likely to be the correct site home at step 912. For instance, it may be determined that certain methods 400, 500, 600, 700 & 800 of FIGS. 4 though 8 provide more reliable results than do others. In this way, an order of preference may be determined for the various methods 400, 500, 600, 700 & 800 so that when two or more methods return differing results the result of one method is preferred over the others. Alternately, the user may be provided with a list of links to each of the probable site homes and allowed to select the site to which he or she wishes to navigate at step 910. This list may, for example, be displayed within the display area 310 of the network browser display of FIG. 3B.

When a site home is selected at steps 906 or 912, the site home navigation control would inherit the link properties of the site home. In this manner, as shown in FIG. 3B, the contents of the site home may be displayed within the viewing area 310 of the browser display 300 thereby replacing the contents of the site page. Alternately, as shown in FIG. 3C, the contents of the site home may be displayed simultaneously with the contents of the site page as a separate frame within the viewing area 310 of the network browser display 300.

When no site home can be determined at step 906, a message is communicated to the user indicating that the site home is not available at step 914. Such a message may, in one embodiment, be provided via a message box displayed over the network browser display 300 shown in FIG. 3A.

Although the invention has been described with a certain degree of particularity, it should be recognized that elements thereof may be altered by persons skilled in the art without departing from the scope and spirit of the invention. It is understood that the specific orders or hierarchies of steps in the methods disclosed in FIGS. 1 and 4 through 9 are examples of presently preferred approaches. Based upon design preferences, it is understood that the specific order, or hierarchy of the methods can be rearranged while remaining within the scope of the present invention. The attached method claims present elements of the various steps in a sample order, and are not meant to be limited to the specific order or hierarchy presented.

Figure 10:
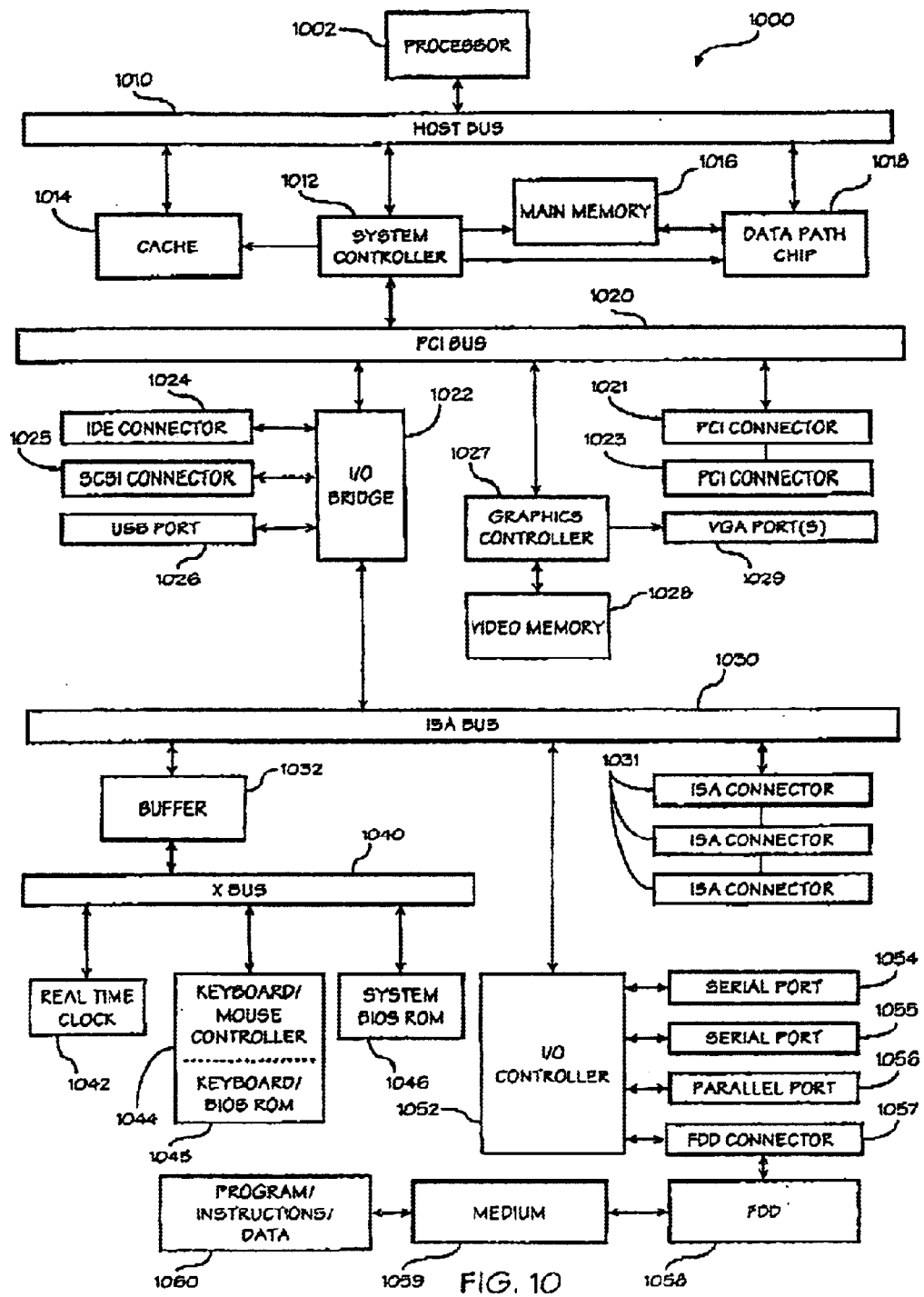
FIG. 10 is a block diagram illustrating an exemplary information handling system suitable for implementation of the present invention.

The present invention can be implemented as sets of instructions resident in the main memory of one or more information handling systems configured generally as described in FIG. 10. For example, in an exemplary embodiment, the present invention may be implemented as an ancillary program of instructions or "plug in" for a network browser application. Until required by the information handling system, the set of instructions may be stored in another readable memory device, for example in a hard disk drive OT in a removable memory such as an optical disk for utilization in a CD-ROM drive, a floppy disk for utilization in a floppy disk drive, a floptical disk for utilization in a floptical drive, a personal computer memory card for utilization in a personal computer card slot, or the like. Further, the set of instructions can be stored in the memory of another information handling system and transmitted over a local area network or a wide area network, such as the information network described herein (e.g. the Internet, an Intranet, or the like), when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

Referring now to FIG. 10, a block diagram of an exemplary information handling system 1000 suitable for implementing the methods of the present invention is shown. In this embodiment, processor 1002, system controller 1012, cache 1014, and data-path chip 1018 are each coupled to host bus 1010. Processor 1002 is a microprocessor such as a 486-type chip, a Pentium®, Pentium II®, Pentium III® (Pentium is a registered trademark of Intel Corporation) or other suitable microprocessor. Cache 1014 provides high-speed local-memory data (in one embodiment, for example, 512 KB of data) for processor 1002, and is controlled by system controller 1012, which loads cache 1014 with data that is expected to be used soon after the data is placed in cache 1012 (i.e., in the near future). Main memory 1016 is coupled between system controller 1014 and data-path chip 1018, and in one embodiment, provides random access memory of between 16 MB and 128 MB of data. In one embodiment, main memory 1016 is provided on SIMs (Single In-line Memory Modules), while in another embodiment, main memory 1016 is provided on DMMs (Dual In-line Memory Modules), each of which plugs into suitable sockets provided on a motherboard holding many of the other components shown in FIG. 10. Main memory 1016 includes standard DRAM (Dynamic Random Access Memory), EDO (Extended Data Out) DRAM, SDRAM (Synchronous DRAM), or other suitable memory technology. System controller 1012 controls PCI (Peripheral Component Interconnect) bus 1020, a local bus for system 1000 that provides a high-speed data path between processor 1002 and various peripheral devices, such as video, disk, network, etc. Data-path chip 1018 is also controlled by system controller 1012 to assist in routing data between main memory 1016, host bus 1010, and PCI bus 1020.

In one embodiment, PCI bus 1020 provides a 32-bit-wide data path that runs at 33 MHz. In another embodiment, PCI bus 1020 provides a 64-bit-wide data path that runs at 33 MHz. In yet other embodiments, PCI bus 1020 provides 32-bit-wide or 64-bit-wide data paths that runs at higher speeds. In one embodiment, PCI bus 1020 provides connectivity to I/O bridge 1022, graphics controller 1027, and one or more PCI connectors 1021, each of which accepts a standard PCI card. In one embodiment, I/O bridge 1022 and graphics controller 1027 are each integrated on the motherboard along with system controller 1012, in order to avoid a board-connector-board signal-crossing interface and thus provide better speed and reliability. In the embodiment shown, graphics controller 1027 is coupled to a video memory 1028 (that includes memory such as DRAM, EDO DRAM, SDRAM, or VRAM (Video Random Access Memory)), and drives VGA (Video Graphics Adapter) port 1029. VGA port 1029 can connect to VGA-type or SVGA (Super VGA)-type displays. Other input/output (I/O) cards having a PCI interface can be plugged into PCI connectors 1021.

In one embodiment; I/O bridge 1022 is a chip that provides connection and control to one or more independent IDE connectors 1024–1025, to a USB (Universal Serial Bus) port 1026, and to ISA (Industry Standard Architecture) bus 1030. In this embodiment, IDE connector 1024 provides connectivity for up to two standard IDE-type devices such as hard disk drives, CD ROM (Compact Disk Read Only Memory) drives, DVD (Digital Video Disc) drives, or TBU (Tape Backup Unit) devices. In one similar embodiment, two IDE connectors 1024 are provided, and each provide the EIDE (Enhanced IDE) architecture. In the embodiment shown, SCSI (Small Computer System Interface) connector 1025 provides connectivity for up to seven or fifteen SCSI-type devices (depending on the version of SCSI supported by the embodiment). In one embodiment, I/O bridge 1022 provides ISA bus 1030 having one or more ISA connectors 1031 (in one embodiment, three connectors are provided). In one embodiment, ISA bus 930 is coupled to I/O controller 1052, which in turn provides connections to two serial ports 1054 and 1055, parallel port 1056, and FDD (Floppy Disk Drive) connector 1057. In one embodiment, FDD connector 1057 is connected to FDD 1058 that receives removable media (floppy diskette) 1059 on which is stored data and/or program code 1060. In one such embodiment, program code 1060 includes code that controls programmable system 1000 to perform the method described below. In another such embodiment, serial port 1054 is connectable to a computer network such as the Internet, and such network has program code 1060 that controls programmable system 1000 to perform the method described below. In one embodiment, ISA bus 1030 is connected to buffer 1032, which is connected to X bus 1040, which provides connections to real-time clock 1042, keyboard/mouse controller 1044 and keyboard BIOS ROM (Basic Input/Output System Read Only Memory) 1045, and to system BIOS ROM 1046.

FIG. 10 shows one exemplary embodiment of the present invention, however other bus structures and memory arrangements are specifically contemplated.

In one embodiment, I/O bridge 1022 is a chip that provides connection and control to one or more independent IDE connectors 1024–1025, to a USB (Universal Serial Bus) port 1026, and to ISA (Industry Standard Architecture) bus 1030. In this embodiment, IDE connector 1024 provides connectivity for up to two standard IDE-type devices such as hard disk drives or CDROM (Compact Disk Read Only Memory) drives, and similarly IDE connector 1025 provides connectivity for up to two IDE-type devices. In one such embodiment, IDE connectors 1024 and 1025 each provide the EIDE (Enhanced IDE) architecture. In one embodiment, I/O bridge 1022 provides ISA bus 1030 having one or more ISA connectors 1031 (in one embodiment, three connectors are provided). In one embodiment, ISA bus 1030 is coupled to I/O controller 1052, which in turn provides connections to two serial ports 1054 and 1055, parallel port 1056, and FDD (Floppy-Disk Drive) connector 1057. In one embodiment, ISA bus 1030 is connected to buffer 1032, which is connected to X bus 1040, which provides connections to real-time clock 1042, keyboard/mouse controller 1044 and keyboard BIOS ROM (Basic Input/Output System Read Only Memory) 1045, and to system BIOS ROM 1046.

It is believed that the method of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for locating and navigating to a site home of a network site in an information network from a site page within the network site using a site home navigation control associated with a user's computer, wherein the network site is not an intranet site associated with the user's computer, comprising:

receiving a request to navigate from a site page to a site home of the network site using the site home navigation control associated with the user's computer;

determining a site home for the network site; and wherein a site home is found for the network site, navigating to the site home in response to the received request.

2. The method as claimed in claim 1, further comprising the step of wherein a site home is not found for the network site, communicating to the user that the site home was not found.

3. The method as claimed in claim 1, wherein the step of determining a site home for the network site further comprises locating the address of the site home by identifying a characteristic label assigned to the site home.

4. The method as claimed in claim 3, wherein the step identifying a characteristic label further comprises:

retrieving a hypertext markup language (HTML) <Header> metatag associated with the site page;

determining if HTML <Header> metatag includes a <Title/> tag;

determining if the <Title/> tag includes a characteristic label;

determining that the site page is the site home, if the <Title/> tag includes a characteristic label; and searching a server serving up the network site for the characteristic label, if the HTML <Header> metatag does not include a <Title/> tag or the <Title/> tag does not include a characteristic label.

5. The method as claimed in claim 4, wherein the characteristic label comprises at least one of index.htm, index.html, default.htm, default.html, home.htm, and home.html.

6. The method as claimed in claim 1, wherein the step of determining a site home for the network site further comprises:

reading the address of the site page wherein the address comprises at least two address components and a separator for separating the address component from other components of the address; and parsing the address of the site page into its constituent address components wherein one of the parsed address components comprises the address of the site home.

7. The method as claimed in claim 6, wherein the address comprises the uniform resource locator (URL) of the site page.

8. The method as claimed in claim 7, wherein the separator comprises at least one of a slash ("/") and a double slash ("//") and wherein the address of the site home is separated from the rest of the uniform resource locator (URL) of the site page by a leading double slash ("//") and a trailing slash ("/").

9. The method as claimed in claim 1, wherein the step of determining a site home for the network site further comprises:

reading the address of the site page wherein the address comprises at least two address components each separated by a separator; and parsing the address of the site page into the one or more address components;

comparing each of the parsed address components to an index of stored site home addresses wherein the parsed address component matching a stored site home address comprises the address of the site home.

10. The method as claimed in claim 9, wherein the address comprises a uniform resource locator (URL) associated with the site page.

11. The method as claimed in claim 10, wherein the separator comprises at least one of a slash ("/") and a double slash ("//") and wherein the address of the site home is separated from other address components of the uniform resource locator (URL) of the site page by a leading double slash ("//") and a trailing slash ("/").

12. The method as claimed in claim 1, wherein the step of determining the site home for the network site further comprises:

detecting if a site map exists for the network site; and interrogating the site map to identify an address of the site home from the site map, if a site map is detected.

13. The method as claimed in claim 12, wherein the address comprises a uniform resource locator (URL) associated with the site home.

14. The method as claimed in claim 1, wherein the step of determining the site home for the network site further comprises:

retrieving a hypertext markup language (HTML) <Header> metatag associated with the site page; and determining if the hypertext markup language (HTML) <Header> metatag includes a site home tag for identifying the site home for the network site.

15. The method as claimed in claim 1, wherein the step of receiving a request to navigate from a site page to the site home of the network site comprises detecting invocation of a site home navigation control.

16. A program of instructions storable on a medium readable by an information handling system for causing the information handling system to execute steps for locating and navigating to a site home of a network site in an information network from a site page within the network site using a site home navigation control associated with a user's computer, wherein the network site is not an intranet site associated with the user's computer, the steps comprising:

receiving a request to navigate from a site page to the site home of the network site using the site home navigation control associated with the user's computer;

determining a site home for the network site; and navigating to the site home in response to the received request, if a site home is found for the network site;

whereby information provided by the site home may be communicated to a user.

17. The program of instructions as claimed in claim 16, further comprising the step of wherein a site home is not found for the network site, communicating to the user that the site home was not found.

18. The program of instructions as claimed in claim 16, wherein the step of determining a site home for the network site further comprises locating the address of the site home by identifying a characteristic label assigned to the site home.

19. The program of instructions as claimed in claim 18, wherein the step identifying a characteristic label further comprises:

retrieving a hypertext markup language (HTML) <Header> metatag associated with the site page;

determining if HTML <Header> metatag includes a <Title/> tag;

determining if the <Title/> tag includes a characteristic label;

determining that the site page is the site home, if the <Title/> tag includes a characteristic label; and searching a server serving up the network site for the characteristic label, if the HTML <Header> metatag does not include a <Title/> tag or the <Title/> tag does not include a characteristic label.

20. The program of instructions as claimed in claim 19, wherein the characteristic label comprises at least one of index.htm, index.html, default.htm, default.html, home.htm, and home.html.

21. The program of instructions as claimed in claim 16, wherein the step of determining a site home for the network site further comprises:

reading the address of the site page wherein the address comprises at least one address components and a separator for separating the address component from other components of the address; and parsing the address of the site page into its constituent address components wherein one of the parsed address components comprises the probable address of the site home.

22. The program of instructions as claimed in claim 21, wherein the address comprises the uniform resource locator (URL) of the site page.

23. The program of instructions as claimed in claim 22, wherein the separator comprises at least one of a slash ("/") and a double slash ("//") and wherein the address of the site home is separated from the rest of the uniform resource locator (URL) of the site page by a leading double slash ("//") and a trailing slash ("/").

24. The program of instructions as claimed in claim 16, wherein the step of determining a site home for the network site further comprises:

reading the address of the site page wherein the address comprises at least one address components each separated by a separator; and parsing the address of the site page into the one or more address components;

comparing each of the parsed address components to an index of stored site home addresses wherein the parsed address component matching a stored site home address comprises the address of the site home.

25. The program of instructions as claimed in claim 24, wherein the address comprises a uniform resource locator (URL) associated with the site page.

26. The program of instructions as claimed in claim 25, wherein the separator comprises at least one of a slash ("/") and a double slash ("//") and wherein the address of the site home is separated from other address components of the uniform resource locator (URL) of the site page by a leading double slash ("//") and a trailing slash ("/").

27. The program of instructions as claimed in claim 16, wherein the step of determining the site home for the network site further comprises:

detecting if a site map exists for the network site; and interrogating the site map to identify an address of the site home from the site map, if a site map is detected.

28. The program of instructions as claimed in claim 27, wherein the address comprises a uniform resource locator (URL) associated with the site home.

29. The program of instructions as claimed in claim 16, wherein the step of determining the site home for the network site further comprises:

retrieving a hypertext markup language (HTML) <Header> metatag associated with the site page;

determining if the hypertext markup language (HTML) <Header> metatag includes a site home tag for identifying the site home for the network site.

30. The program of instructions as claimed in claim 16, wherein the step of receiving a request to navigate from a site page to the site home of the network site comprises detecting invocation of a site home navigation control.

31. An information handling system, comprising:

a processor for executing a program of instructions on the information handling system;

a memory coupled to the processor for storing the program of instructions executable by the processor; and a communication device for coupling the information handling system to an information network;

the program of instructions for configuring the information handling system to to execute steps for locating and navigating to a site home of a network site in an information network from a site page within the network site using a site home navigation control associated with the information handling system, wherein the network site is not an intranet site associated with the information handling system, the steps comprising:

receiving a request to navigate from a site page to the site home of the network site using the site home navigation control associated with the information handling system;

determining a site home for the network site; and navigating to the site home in response to the received request, if a site home is found for the network site;

wherein information provided by the site home may be communicated to a user.

32. The information handling system as claimed in claim 31, further comprising a display for displaying information to a user of the information handling system, said display capable of displaying a graphical user interface to the user wherein the graphical user interface includes a site home navigation control for allowing the user to request navigation to the site home.

33. The information handling system as claimed in claim 31, wherein the program of instructions is capable of configuring the information handling system for locating the address of the site home by identifying a characteristic name assigned to the site home.

34. The information handling system as claimed in claim 33, wherein the characteristic name is provided by a <Title/> tag contained within a hypertext markup language (HTML) <Header> metatag associated with the site page.

35. The information handling system as claimed in claim 33, wherein the characteristic name comprises at least one of index.htm, index.html, default.htm, default.html, home.htm, and home.html.

36. The information handling system as claimed in claim 31, wherein the program of instructions is capable of configuring the information handling system for locating a site home tag for identifying a site home of the network site.

37. The information handling system as claimed in claim 31, wherein the program of instructions is capable of configuring the information handling system for locating the address of the site home by parsing the address of the site page into the one or more address components wherein one of the parsed address components comprises the address of the site home.

38. The information handling system as claimed in claim 37, wherein the addresses of the site page and site home comprise a uniform resource locator (URL).

39. The information handling system as claimed in claim 31, wherein the program of instructions is capable of configuring the information handling system for locating the address of the site home by parsing the address of the site page into the one or more address components and comparing each of the parsed address components to an index of stored site home addresses wherein the parsed address component matching a stored site home address comprises the address of the site home.

40. The information handling system as claimed in claim 39, wherein the addresses of the site page and site home comprise a uniform resource locator (URL).

41. The information handling system as claimed in claim 31, wherein the program of instructions is capable of configuring the information handling system for:

detecting if a site map exists for the network site; and interrogating the site map to identify an address of the site home from the site map, if a site map is detected.

42. The information handling system as claimed in claim 41, wherein the addresses of the site page and site home comprise a uniform resource locator (URL).

43. A method for locating and navigating to a site home of a network site in an information network from a site page within the network site using a site home navigation control associated with a user's computer, wherein the network site is not an intranet site associated with the user's computer, comprising:

displaying the site page within a network browser display of a network browser, the network browser providing the site home navigation control associated with the user's computer;

receiving a request to navigate from a site page to the site home of the network site, the request being provided in response to a user selecting the site home navigation control;

determining a site home for the network site; and wherein a site home is found for the network site, navigating to the site home in response to the received request so that the site home is displayed within the network browser display.

44. The method as claimed in claim 1, further comprising:

providing, as part of a browser display, a graphical user interface button configured to receive requests to navigate the site home of the network site.

45. The program of instructions as claimed in claim 16, further comprising:

providing, as part of a browser display, a graphical user interface button configured to receive requests to navigate the site home of the network site.

46. The information handling system as claimed in claim 31, wherein the program of instructions provides, as part of a browser display, a graphical user interface button configured to receive requests to navigate the site home of the network site.

* * * * *